United States Patent
Lee

(10) Patent No.: US 7,450,941 B2
(45) Date of Patent: Nov. 11, 2008

(54) METHOD FOR PERFORMING ROAMING CAPABLE OF MINIMIZING PING-PONG PHENOMENON AND DUAL MODE MOBILE TERMINAL USING THE SAME

(75) Inventor: Sun-Ho Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 506 days.

(21) Appl. No.: 11/348,596

(22) Filed: Feb. 7, 2006

(65) Prior Publication Data

US 2007/0014261 A1    Jan. 18, 2007

(30) Foreign Application Priority Data

Jul. 15, 2005    (KR) ................ 10-2005-0064498

(51) Int. Cl.
*H04Q 7/20*    (2006.01)
(52) U.S. Cl. ............... 455/432.1; 455/436; 455/456.1; 370/331; 370/335
(58) Field of Classification Search ........... 455/432.1, 455/436, 456.1; 370/331, 335
See application file for complete search history.

(56) References Cited

U.S. PATENT DOCUMENTS 6,314,290 B1 * 11/2001 Joshi et al. ................ 455/427

FOREIGN PATENT DOCUMENTS

| WO | WO 01/03464 | 1/2001 |
| WO | WO 01/58190 | 8/2001 |
| WO | WO 2004/047479 | 6/2004 |

* cited by examiner

*Primary Examiner*—Nghi H Ly
(74) *Attorney, Agent, or Firm*—The Farrell Law Firm, PC

(57) ABSTRACT

Disclosed is a method for performing roaming capable of minimizing a ping-pong phenomenon and a dual mode mobile terminal using the same. Functions for the method for performing roaming and the dual mode mobile terminal using the same are realized such that a ping-pong phenomenon occurring in a shadow area of one of the communication networks providing communication services using different mobile communication techniques can be minimized. To this end, it is determined if the dual mode mobile terminal is in a shadow area by counting the number of ping-pong occurrences in the process of performing a mode based on a corresponding communication service and a ping-pong period is adjusted only when the dual mode mobile terminal is in the shadow area, thereby minimizing a ping-pong phenomenon.

12 Claims, 5 Drawing Sheets

METHOD FOR PERFORMING ROAMING CAPABLE OF MINIMIZING PING-PONG PHENOMENON AND DUAL MODE MOBILE TERMINAL USING THE SAME

PRIORITY

This application claims priority to an application entitled "Method for Performing Roaming Capable of Minimizing Ping-Pong Phenomenon and Dual Mode Mobile Terminal Using The Same" filed in the Korean Intellectual Property Office on Jul. 15, 2005 and assigned Serial No. 2005-64498, the contents of which are incorporated herein by reference.

BACKGROUND OF THE INVENTION

1. Field of the Invention

The present invention relates to a method for performing roaming in a dual mode mobile terminal, which can minimize a ping-pong phenomenon occurring under a weak electric field between communication networks providing communication services using different mobile communication techniques.

2. Description of the Related Art

Recently, a code division multiple access (CDMA) communication system has been implemented over a large area with a sufficient infrastructure. However, a third generation network, such as a wideband code division multiple access (WCDMA) network, has been gradually introduced in order to provide services which cannot be supported by a second generation network such as the CDMA network. In addition, a dual mode mobile terminal designed to receive a service specialized for the third generation network in an area located in the third generation network while using the infrastructure of the second generation network has been developed.

Recently, a dual mode user equipment or a dual mode mobile terminal simultaneously supporting the WCDMA and the CDMA has been developed out of necessity to provide a user with a mobile terminal capable of operating through both techniques (the WCDMA and the CDMA). One dual mode mobile terminal including the two modes requires various techniques capable of operating in the two modes. Among these techniques, one includes roaming being performed when the WCDMA mode and the CDMA mode are switched to each other inside of the terminal.

Generally, the roaming function enables a dual mode mobile terminal to perform switching between the CDMA mode and the WCDMA mode, so that the dual mode mobile terminal operating in the WCDMA mode in the WCDMA service area can switch from the WCDMA mode to the CDMA mode when the dual mode mobile terminal moves to a CDMA service area. The roaming function in an area where the typical CDMA system and the typical WCDMA system are installed will be described with reference to FIG. 1. FIG. 1 illustrates an area where the typical CDMA system and the typical WCDMA system are installed. The area, where a CDMA system and a WCDMA system are installed, is classified into a single CDMA area supporting only a CMDA service and a superposition area simultaneously supporting a WCDMA service as well as the CDMA service.

Generally, when a dual mode mobile terminal 10 set to a WCDMA preferred mode is turned on, the dual mode mobile terminal 10 first attempts to acquire the WCDMA network system. If the dual mode mobile terminal 10 successfully acquires the WCDMA network system, the dual mode mobile terminal 10 operates in the WCDMA mode. If the dual mode mobile terminal 10 fails to acquire a WCDMA network system, the dual mode mobile terminal 10 attempts to acquire a CDMA network system.

Thereafter, if the dual mode mobile terminal 10 having successfully acquired the WCDMA network system operates as the WCDMA mode in the WCDMA network, or in a superposition area 30 and then enters a single CDMA area 40, the dual mode mobile terminal 10 searches for a CDMA base station because it cannot detect a WCDMA base station. Then, if the dual mode mobile terminal 10 detects the CDMA base station, it completes a roaming process by switching from the WCDMA mode to the CDMA mode. In contrast, if the dual mode mobile terminal 10 enters the superposition area 30, the dual mode mobile terminal 10 in the CDMA mode performs roaming in order to switch from the CDMA mode to the WCDMA mode according to a predetermined condition. As described above, the dual mode mobile terminal 10 having acquired one network system attempts roaming to another network system if the intensity of a signal received from a network system, which covers the dual mode mobile terminal 10, is lowered to a predetermined intensity during a predetermined time interval after the acquisition.

Generally, when the dual mode mobile terminal 10 operating in the WCDMA mode exits the WCDMA service area, the dual mode mobile terminal 10 performs roaming to the CDMA mode. As described above, the dual mode mobile terminal 10 can determine, based on system parameters received from the CDMA base station, when the dual mode mobile terminal 10 is positioned in the superposition area capable of providing a WCDMA service or in an area supporting only a CDMA service. The determination may be achieved even when the dual mode mobile terminal 10 is in the CDMA mode. Accordingly, if it is determined that the dual mode mobile terminal 10 is positioned in the WCDMA superposition area 30 based on the system parameters received from the CDMA base station, the dual mode mobile terminal 10 operating in the CDMA mode performs roaming to the WCDMA network system.

In detail, as shown in FIG. 1, the dual mode mobile terminal 10 is positioned on a border cell 20 adjacent to the CDMA network in the WCDMA area. In this case, if the dual mode mobile terminal 10 receives system parameters, which are used for reporting entry into the superposition area 30, from the CDMA base station on a border between the superposition area 30 and the single CDMA area 40, the dual mode mobile terminal 10 performs handover toward the WCDMA network. In other words, the dual mode mobile terminal 10 communicates with the WCDMA network. However, if it is determined that signal intensity of the WCDMA network in a shadow area 50 is included in a weak electric field (e.g., inside of the building) having at most a preset threshold value, the dual mode mobile terminal 10 continuously attempts roaming until the dual mode mobile terminal 10 acquires the WCDMA network system in a state where the dual mode mobile terminal 10 has acquired the CDMA network system. Accordingly, as the dual mode mobile terminal passes through the shadow area 50, which is an area having a weak WCDMA receive signal intensity, a ping-pong phenomenon occurs in which a handover procedure is repeated by continuously performing the roaming function from the CDMA network 40 to the WCDMA network 30.

As described above, conventionally, when a dual mode mobile terminal attempts roaming from one mode to another mode in a weak electric field area, if the one mode is not switched to another mode corresponding to a network (a target of roaming), the mode of the dual mode mobile terminal returns to the one mode, this back-and-forth process is referred to as a "ping-pong phenomenon". As described above, when roaming is repeatedly performed between different networks according to the intensity of a received signal; the probability of errors of the dual mode mobile terminal may increase. In addition, when full-searching is performed to search for cells in the WCDMA service area, the dual mode mobile terminal remains in a system switching state during the range of 20 seconds to a maximum of 2 minutes. Accordingly, the dual mode mobile terminal does not receive services during the system switching state, thereby causing an inconvenience to a user for receiving the communication service.

SUMMARY OF THE INVENTION

Accordingly, the present invention has been made to solve at least the above-mentioned problems occurring in the prior art, and it is an object of the present invention to provide a method for performing roaming and a dual mode mobile terminal using the same, which can minimize a ping-pong phenomenon occurring in a shadow area of one of communication networks providing communication services using different mobile communication techniques.

Another object of the present invention is to provide a method for performing roaming and a dual mode mobile terminal using the same, which can minimize a ping-pong phenomenon occurring when the roaming is performed between communication networks providing communication services using different mobile communication techniques so as to minimize a time required for a system switching state, thereby improving system performance.

To accomplish the above objects, there is provided a method for performing roaming capable of minimizing a ping-pong phenomenon in a dual mode mobile terminal, the method including the steps of determining if a current position is a service superposition area based on information received from a first communication network, attempting roaming to a second communication network during a predetermined time interval when the current position corresponds to the service superposition area, determining if the current position corresponds to a shadow area of the second communication network by determining a failure of the roaming attempt and movement between cells, and attempting roaming to the second communication network by maximizing the predetermined time interval when the current position corresponds to the shadow area of the second communication network.

According to another aspect of the present invention, there is provided a dual mode mobile terminal for performing roaming for minimizing a ping-pong phenomenon, the dual mode mobile terminal including a first module for receiving from a first communication network information representing whether or not the dual mode mobile terminal is in a service superposition area, enabling communication through a first communication network scheme, and detecting a signal received from the first communication network, a second module for enabling communication through a second communication network scheme and detecting a signal detected from the second communication network, and a controller for determining if a current position of the dual mode mobile terminal is the service superposition area based on information received from the first communication network, attempting roaming to the second communication network during a predetermined time interval when the current position corresponds to the service superposition area, determining if the current position corresponds to a shadow area of the second communication network by determining a failure of the roaming attempt and movement between cells, and attempting roaming to the second communication network by maximizing the predetermined time interval when the current position corresponds to the shadow area of the second communication network.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
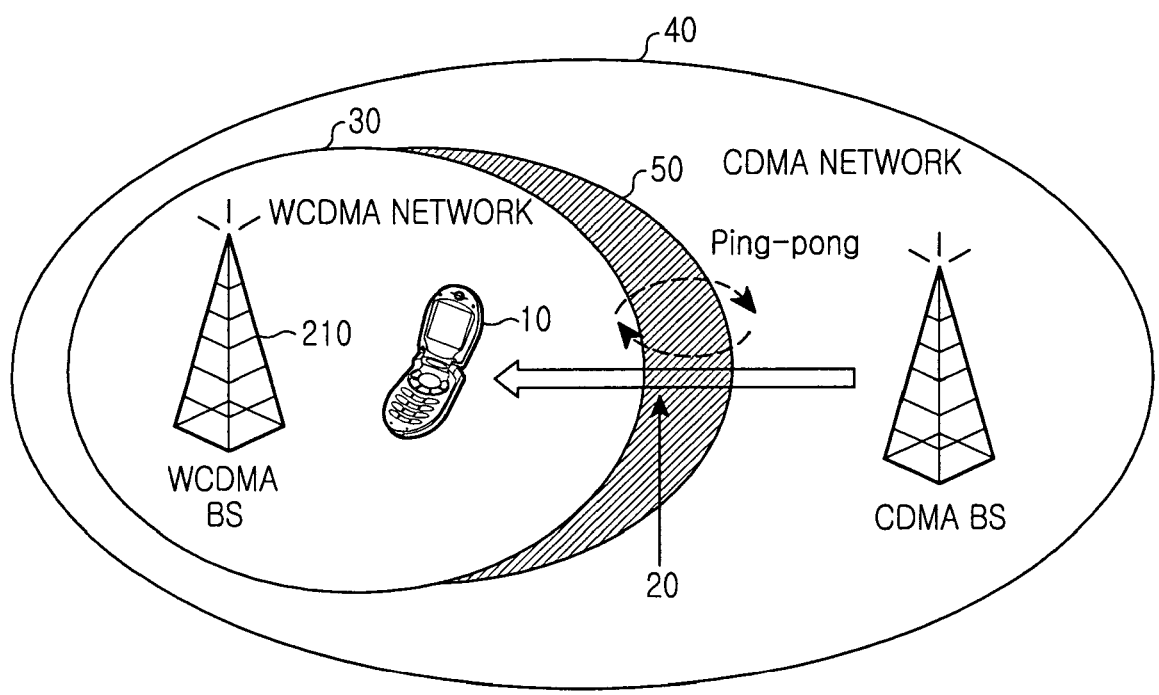
FIG. 1 illustrates an area where the typical CDMA system and the typical WCDMA system are installed.

Hereinafter, a preferred embodiment of the present invention will be described in detail with reference to the accompanying drawings. Note that the same or similar components in drawings are designated by the same reference numerals although they are shown in different drawings. In the following description of the present invention, a detailed description of well known functions and configurations incorporated herein will be omitted when it may make the subject matter of the present invention rather unclear.

A code division multiple access (CDMA) technique and a wideband code division multiple access (WCDMA) technique will be described as examples of different mobile communication techniques according to the present invention. In addition, it is assumed that a user initially sets a dual mode mobile terminal to a WCDMA mode. Herein, although the CDMA technique and the WCDMA technique are employed as different communication techniques according to the present invention, the present invention is not limited to theses communication techniques and can be adapted for terminals employing different communication techniques. Accordingly, it is natural that the present invention be adaptable to an area employing different mobile communication techniques, in which a non-national network (local network) is superposed on a national network.

In addition, it is assumed that the CDMA network system periodically monitors, based on system parameters, whether or not a dual mode mobile terminal is currently positioned in the superposition area where the WCDMA network system is installed. When two different communication networks coexist, one communication network covers a relatively larger area, the other communication network covers a relatively smaller area, and the system covering the relatively larger area provides information representing whether or not a current area is the superposition area.

When a dual mode mobile terminal sets priority for a system covering the smaller area and acquires a system having a lower priority, if the present invention is applied at a point in time where the dual mode mobile terminal acquires a system having higher priority, it is possible to minimize the number of ping-pong occurrences between the systems and maximize an available service time of a terminal.

Figure 2:
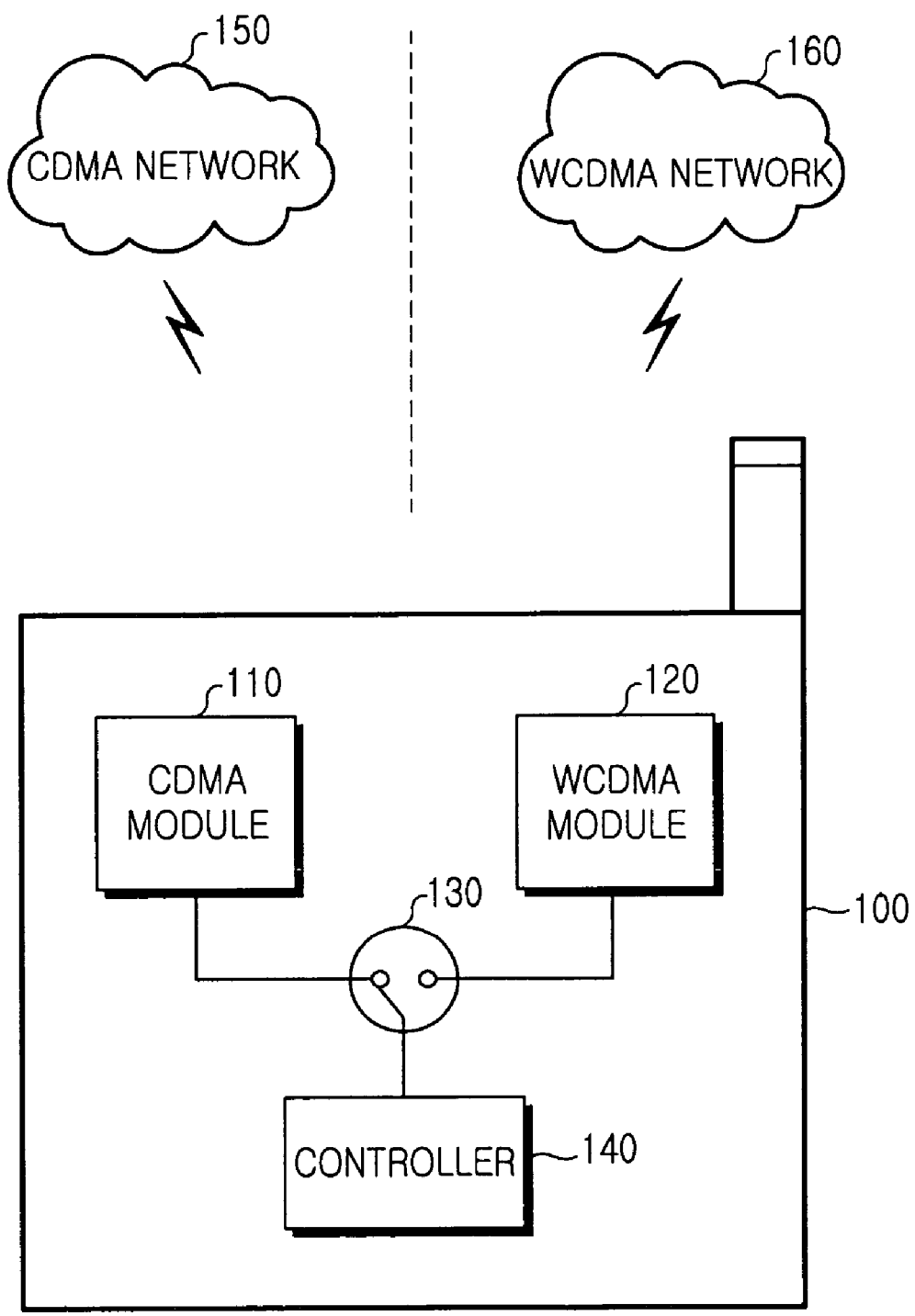
FIG. 2 illustrates the internal structure of a dual mode mobile terminal according to an embodiment of the present invention.

Hereinafter, a description of the components and an operation of a dual mode mobile terminal having such a function will be given with reference to FIG. 2. FIG. 2 illustrates the internal structure of the dual mode mobile terminal according to an embodiment of the present invention.

A dual mode mobile terminal 100 supporting both a CDMA mode and a WCDMA mode includes a CDMA module 110 and a WCDMA module 120, enabling operations according to corresponding modes, a switch 130, and a controller 140 for controlling these components. In addition, each module includes a corresponding modem (not shown) and an RF part (not shown), and the dual mode mobile terminal supporting the WCDMA mode and the CDMA mode uses modem chips supporting mutually-different mobile communication services according to corresponding modes. Accordingly, the CMDA module 110 provides software for performing a CDMA mobile communication, and the WCDMA module 120 provides software for performing a WCDMA mobile communication.

The CDMA module 110 can receive from a CDMA network information about whether or not the dual mode mobile terminal is positioned in a service superposition area, communicate through the CDMA network scheme, and detect a signal received from the CDMA network. In addition, the WCDMA module 120 can communicate through the WCDMA network scheme and detect a signal received from the WCDMA network. Thus, the modules 110 and 120 continuously monitor the intensity of a signal from a current cell after booting up.

These modules 110 and 120 are connected to the controller 140, which is an application processor, through a hardware communication path. Herein, the controller 140 is a multimedia chip used for processing transmitted/received data. Such a controller controls a corresponding module so that the corresponding module can operate depending on whether or not the terminal 100 is positioned in the CDMA network or the WCDMA network. A communication port of the controller 140 is selectively connected to one of the CMDA module 110 and the WCDMA module 120 by means of a switch. As described above, the controller 140 corresponds on a 1:1 basis to each of the modules 110 and 120 by means of the switch, and, if one module is operating, the other module is turned off in order to reduce power consumption.

Accordingly, if the dual mode mobile terminal 100 is positioned at the WCDMA network, the CDMA module 110 (i.e., a CDMA RF part and a CDMA mode) is temporarily turned off, and, in contrast, the WCDMA module 120 (i.e., a WCDMA RF part and a WCDMA modem) is turned on. In addition, since the WCDMA module 120 is connected to the controller 140 by means of the switch 130, the terminal 100 operates in the WCDMA mode. If the dual mode mobile terminal 100 is positioned at the CMDA network, the dual mode mobile terminal 100 operates in the CDMA mode and a power state is changed from the above-described power state.

If the dual mode mobile terminal 100 operates in the WCDMA mode, the WCDMA module 120 measures the intensity of a received signal and provides the measurement result to the controller 140 by means of the switch 130. Then, the controller 140 compares the measurement result with a predetermined value. If the measurement result is less than or equal to the predetermined value, the controller 140 attempts roaming to another communication network.

When the dual mode mobile terminal 100 moves between the CDMA network and the WCDMA network, the controller 140 receives from the CDMA network system parameters representing whether or not the dual mode mobile terminal 100 is positioned in the WCDMA superposition area and can determine whether the dual mode mobile terminal 100 enters or exits the WCDMA superposition area.

As described above, the dual mode mobile terminal 100 includes modules for supporting a CDMA service and a WCDMA service and has a function for handover between the CDMA network and the WCDMA network according to the present invention.

Figure 3:
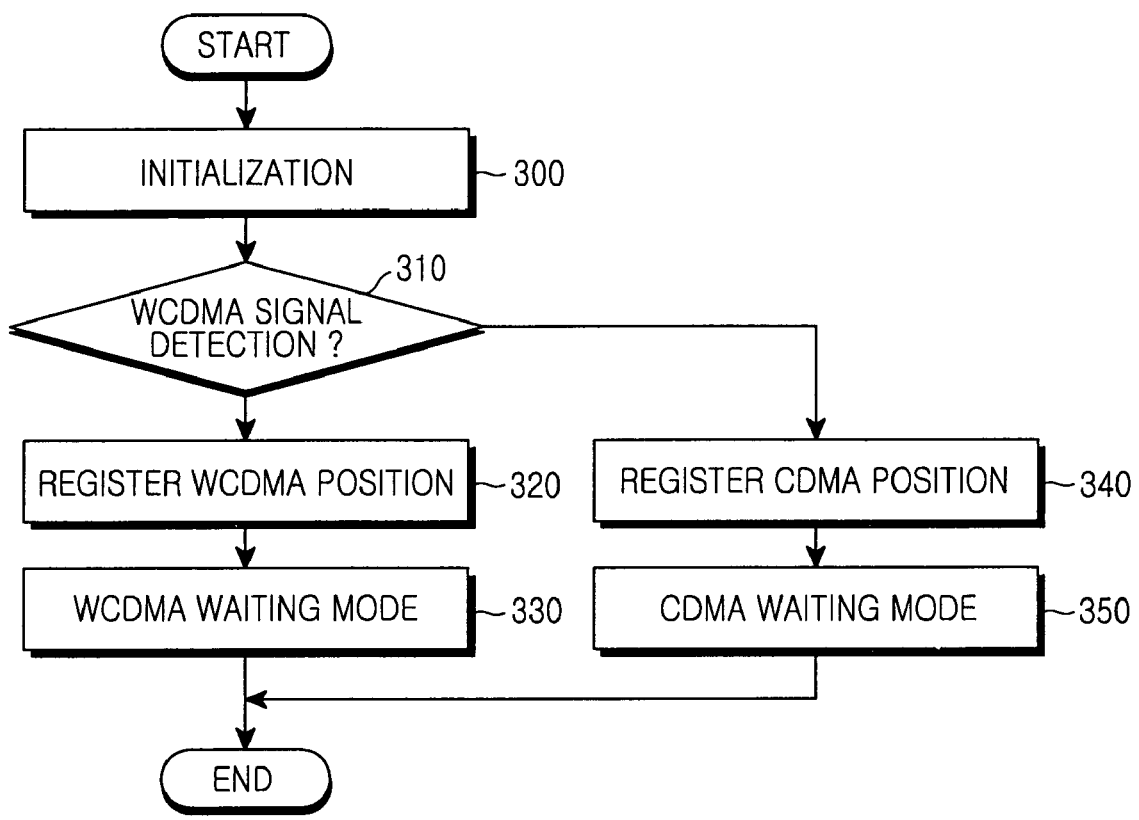
FIG. 3 is a flowchart for controlling an initial operation of a dual mode mobile terminal according to an embodiment of the present invention.

An operational control procedure in an initial state of the dual mode mobile terminal according to an embodiment of the present invention will be described with reference to FIG. 3.

If the dual mode mobile terminal 100 is turned on by a user, the dual mode mobile terminal 100 initializes in step 300. If the WCDMA preferred mode is determined, the dual mode mobile terminal 100 determines in step 310 if a WCDMA signal is detected by measuring field intensity of a search signal while searching for a WCDMA network. If the WCDMA signal is detected, the dual mode mobile terminal 100 registers in step 320 the location thereof in the WCDMA network system. At the same time, the dual mode mobile terminal 100 initializes variables $n_{cell}$ and $n_p$ to "0". The $n_{cell}$ denotes the number of different cells by which the dual mode mobile terminal passes while moving within an area covered by the CDMA network system, and the $n_p$ denotes the number of ping-pong occurrences when the dual mode mobile terminal attempts a WCDMA network system acquisition while communicating with the CDMA network system. Thereafter, the dual mode mobile terminal 100 performs in step 330 a waiting mode, which is an idle state enabling the use of the WCDMA mode. If the WCDMA signal is detected, the dual mode mobile terminal 100 is connected to the WCDMA network and periodically detects a WCDMA signal.

In contrast, if the WCDMA signal is not detected in an initialization stage, the dual mode mobile terminal 100 switches the WCDMA mode into the CDMA mode so as to detect a CDMA signal. If the WCDMA signal is not detected in the WCDMA preferred mode, which has been initially set, the dual mode mobile terminal registers in step 340 the location thereof in the CDMA network and then enters into a waiting mode (which is a CDMA idle state) in step 350 by detecting the CDMA signal from the CDMA network.

Figure 4:
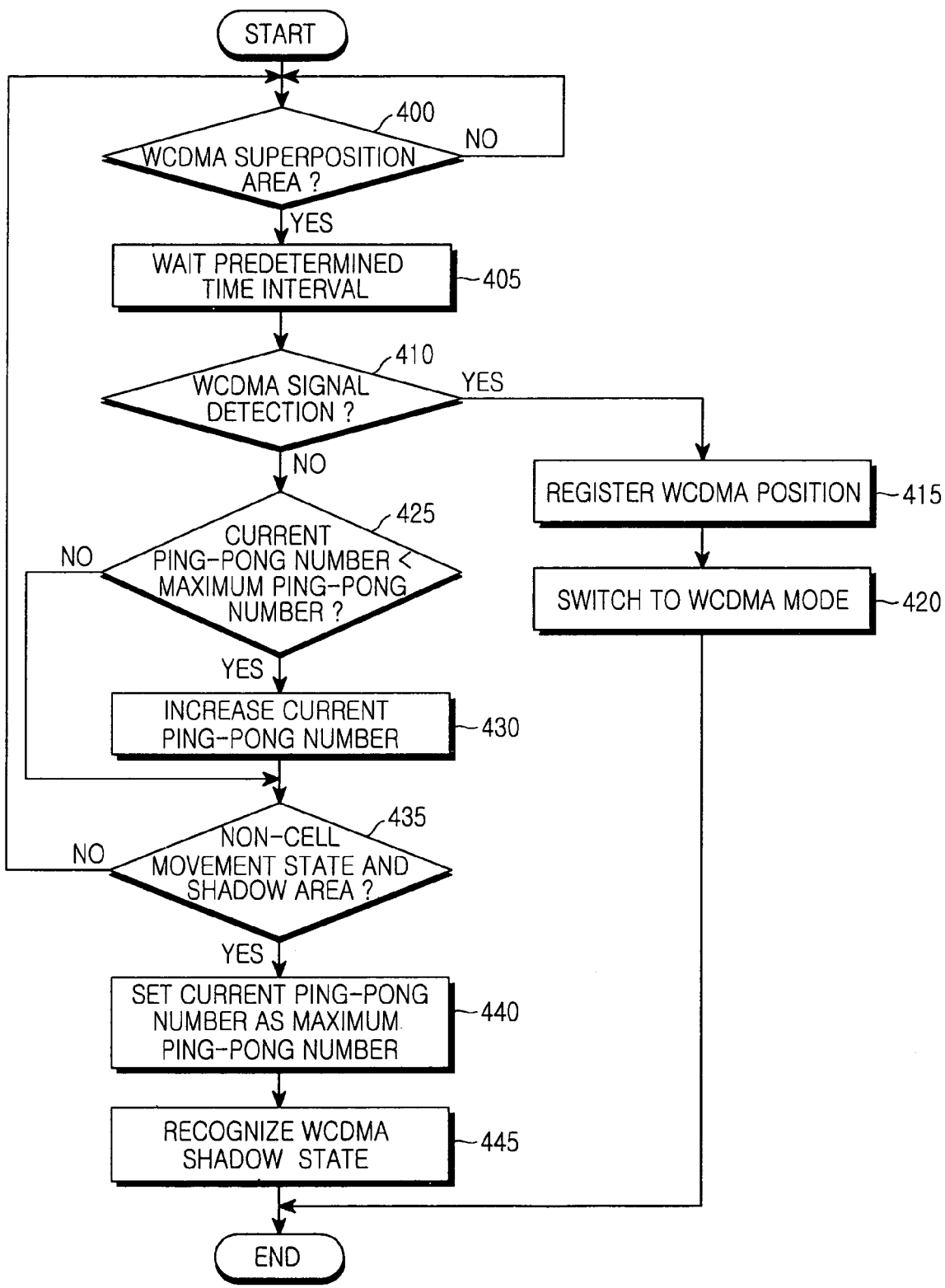
FIG. 4 is a flowchart for controlling an operation of a dual mode mobile terminal in a CDMA waiting mode according to an embodiment of the present invention.

The operation of the dual mode mobile terminal set to the WCDMA preferred mode when the dual mode mobile terminal is in the CDMA waiting mode will be described with reference to FIG. 4. FIG. 4 is a flowchart illustrating a control procedure in the CDMA waiting mode according to an embodiment of the present invention.

The dual mode mobile terminal determines in step 400 based on system parameters broadcasted from the CDMA system, if the dual mode mobile terminal 100 belongs to the superposition area capable of providing a WCDMA service or the single CDMA area capable of only a CDMA service. This determination allows the dual mode mobile terminal in the CDMA mode to perform roaming to the WCDMA network system if the dual mode mobile terminal enters the WCDMA superposition area. If the dual mode mobile terminal confirms the WCDMA superposition area based on the system parameters received in the CDMA system, the dual mode mobile terminal turns on the WCDMA module 120 (i.e., the WCMDA mode and the WCDMA RF module) after a predetermined time interval so as to search for the WCDMA signal.

Accordingly, the dual mode mobile terminal waits a predetermined time interval in step 405 and determines in step 410 if a WCDMA signal is detected during the predetermined time interval. In other words, if the WCDMA superposition area is confirmed, the dual mode mobile terminal in the CDMA mode attempts roaming to the WCDMA network system during the predetermined time interval. In this case, the predetermined time interval corresponds to "$T=(A*B)^{n_p}$", wherein "A" and "B" are predetermined constants, and "$n_p$" is the number of ping-pong occurrences. Accordingly, if the dual mode mobile terminal waits the predetermined time interval corresponding to the equation, the dual mode mobile terminal waits for a time, which exponentially increases according to the increase of the number of the ping-pong occurrences, and then attempts roaming to the WCDMA network system.

If the dual mode mobile terminal detects the WCDMA signal during the predetermined time interval described above, the dual mode mobile terminal performs step 415 so that the intensity of electric field of a search signal is measured while searching for the WCDMA network, acquires the WCDMA system if the intensity of the WCDMA signal exceeds a predetermined intensity, and registers its position in the WCMDA system. In step 420, the dual mode mobile terminal switches the CDMA mode into the WCDMA waiting mode, (which is an idle state). In this case, the dual mode mobile terminal initializes the variables $n_{cell}$ and $n_p$ to "0".

Although the WCDMA signal is detected within the predetermined time interval, if the intensity of the WCDMA signal is weak, that is, if the intensity of the WCDMA signal is less than the predetermined intensity, a ping-pong phenomenon is continuously caused. In order to minimize the ping-pong phenomenon, the dual mode mobile terminal determines in step 425 if the counted number of ping-pong occurrences is less than a maximum number of ping-pong occurrences. In other words, the current number $n_p$ of ping-pong occurrences is less than the maximum number $n_{p\_max}$ of ping-pong occurrences. In this case, the $n_{p\_max}$ is the maximum value of the $n_p$ and is used for minimizing a delay time caused by the ping-pong occurrences of the dual mode mobile terminal between the CDMA network and the WCDMA network. In detail, the $n_{p\_max}$ is used for preventing a waiting time of a user from unlimitedly increasing during the ping-pong occurrences. In particular, the exponentially increasing waiting time is used for minimizing the number of ping-pong occurrences in a shadow area.

If the current number of ping-pong occurrences is less than the maximum number of ping-pong occurrences, the dual mode mobile terminal increases in step 430 the number of ping-pong occurrences and performs step 435. However, if the current number of ping-pong occurrences is not less than the maximum number of ping-pong occurrences, the dual mode mobile terminal directly performs step 435. In detail, if the $n_p$ is less than $n_{p\_max}$, the $n_p$ increases by "1". In contrast, if the $n_p$ is greater than or equal to the $n_{p\_max}$, the $n_p$ does not increase. In step 435, the dual mode mobile terminal determines if the dual mode mobile terminal is located in a shadow area. In this case, if the dual mode mobile terminal moves between cells, the dual mode mobile terminal may detect the WCDMA signal. However, if the dual mode mobile terminal does not move between cells, it is assumed that the received WCDMA signal does not greatly change in view of the intensity thereof, so the dual mode mobile terminal determines both if it moves between cells and if it is positioned in the shadow area. Furthermore, in order to determine if the WCDMA signal is generated from a shadow area such as the interior of a building, the dual mode mobile terminal determines if the $n_p$ is greater than the minimum number $n_{p\_min}$ of ping-pong occurrences. In addition, in order to determine if the dual mode mobile terminal does not move between cells, the dual mode mobile terminal determines if the $n_{cell}$ is less than the minimum number of movement $n_{cell\_min}$ between cells. Herein, it is preferred that the minimum number $n_{p\_min}$ of ping-pong occurrences is less than the maximum number $n_{p\_max}$ of ping-pong occurrences.

If the dual mode mobile terminal does not move between cells and is not positioned in the shadow area, the dual mode mobile terminal returns to step 400 so as to repeatedly detect the WCDMA signal in the CDMA idle state. Through the above-described steps, in order to prevent the ping-pong phenomenon from frequently occurring, the dual mode mobile terminal can detect the WCDMA signal after a long time using a waiting time, which exponentially increases according to an increase of the number of the ping-pong occurrences, if the dual mode mobile terminal does not switch the CDMA mode into the WCDMA mode.

If it is determined that the dual mode mobile terminal is located in the shadow area without movement between cells in step 435, that is, if the above-described conditions are satisfied, since the dual mode mobile terminal undergoes ping-pong phenomena exceeding the $n_{p\_min}$ without the movement between cells, it can be recognized that the dual mode mobile terminal is located in the WCDMA shadow area. Accordingly, the dual mode mobile terminal sets in step 440 the current number of ping-pong occurrences as the maximum number of ping-pong occurrences. In step 445, the dual mode mobile terminal recognizes a WCDMA shadow state and switches to the WCDMA shadow state. As described above, if the dual mode mobile terminal switches into the WCDMA shadow state, the CDMA module 110 is turned on, and a ping-pong period between the CDMA network and the WCDMA network is constantly maintained at "$T=(A*B)^{n_p}$" If the present invention is employed in the WCDMA hole state, it is possible to reduce the number of ping-pong occurrences.

The operation of the dual mode mobile terminal in the WCDMA hole state will be described. To this end, a flowchart for controlling the operation of the dual mode mobile terminal in the WCDMA hole state according to an embodiment of the present invention will be described with reference to FIG. 5.

Figure 5:
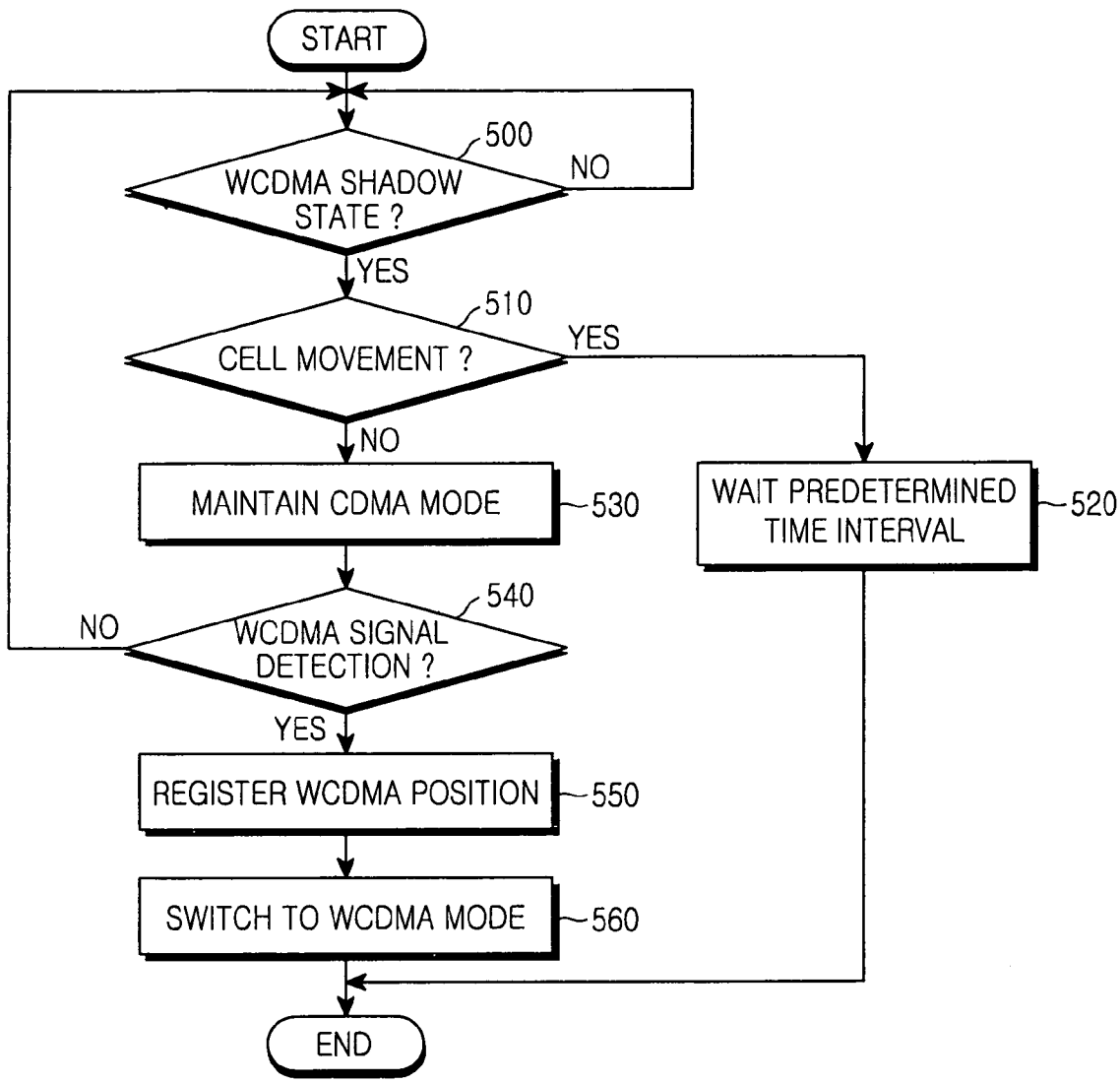
FIG. 5 is a flowchart for controlling an operation of a dual mode mobile terminal in a WCDMA hole state according to an embodiment of the present invention.

Referring to FIG. 5, in step 500, the dual mode mobile terminal determines if a current state is the WCDMA shadow state. This determination is achieved based on the condition that the dual mode mobile terminal is located in the shadow area without movement between cells described in step 435 of FIG. 4. If the dual mode mobile terminal is in the WCDMA shadow state as the determination result, the dual mode mobile terminal determines if it moves between cells in step 510. To this end, the dual mode mobile terminal determines if the variable $n_{cell}$ (the number of cells through which the dual mode mobile terminal passes) is greater than the $n_{cell\_max}$ (the maximum number of cells through which the dual mode mobile terminal passes). If the $n_{cell}$ is greater than the $n_{cell\_max}$, since it is determined that the dual mode mobile terminal has great mobility, there is movement between cells, and the dual mode mobile terminal initializes the $n_{cell}$ and $n_p$ at "0". Then, the dual mode mobile terminal performs steps 520 so as to maintain a waiting mode (the CDMA idle state).

If there is no movement between cells, that is, if the $n_{cell}$ is less than or equal to the $n_{cell\_max}$, the dual mode mobile terminal attempts in step 530 WCDMA system acquisition during a predetermined time interval. In detail, the dual mode mobile terminal detects the WCDMA signal by attempting roaming to the WCDMA network system with the maximum ping-pong period, that is, with the period of $T=(A*B)^{n_p}$. If the dual mode mobile terminal successfully acquires system acquisition by determining if the WCDMA signal is detected in step 540, the dual mode mobile terminal registers its position in the WCDMA system in step 550 and initializes the $n_{cell}$ and the $n_p$ at "0". In step 560, the dual mode mobile terminal switches to the WCDMA waiting mode (the WCDMA idle state). If the dual mode mobile terminal in the WCDMA waiting mode receives a signal having an intensity less than or equal to a predetermined intensity from the WCDMA system, the dual mode mobile terminal can switch to a CDMA waiting mode through a CDMA roaming procedure.

As described above, according to the present invention, it is possible to determine if the dual mode mobile terminal is positioned in a WCDMA shadow area. In addition, according to the present invention, a period of ping-pong occurrences is controlled, thereby minimizing the ping-pong phenomenon in which communication service is stopped in the WCDMA shadow area for one or two minutes.

In addition, according to the present invention, since it is possible to minimize the ping-pong phenomenon, an available service time of a user is maximized, so that it is possible to increase the convenience of a user for the communication service. For example, although a ping-pong phenomenon is minimized only with respect to the CDMA and the WCDMA in the above description, it is natural that the present invention be applied to various mobile communication schemes which may cause the ping-pong phenomenon.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for performing roaming capable of minimizing a ping-pong phenomenon in a dual mode mobile terminal, the method comprising the steps of:
    determining if a current position is a service superposition area based on information received from a first communication network;
    attempting roaming to a second communication network during a predetermined time interval when the current position corresponds to the service superposition area;
    determining if the current position corresponds to a shadow area of the second communication network by determining a failure of the roaming attempt and movement between cells; and
    attempting roaming to the second communication network by maximizing the predetermined time interval when the current position corresponds to the shadow area of the second communication network.

2. The method as claimed in claim 1, wherein, in the step of determining if the current position corresponds to the shadow area of the second communication network, the determination is achieved based on a number of ping-pong occurrences representing a number of the roaming attempt and a number of cells according to movement between cells.

3. The method as claimed in claim 2, wherein the number of ping-pong occurrences is increased by one when the number of ping-pong occurrences is less than a maximum number of ping-pong occurrences, and when a signal of the second communication network is not detected in the roaming, and the number of ping-pong occurrences is set as the maximum number of ping-pong occurrences when the increased number of ping-pong occurrences is less than a minimum number of ping-pong occurrences.

4. The method as claimed in claim 3, wherein the number of ping-pong occurrences is initialized when the dual mode mobile terminal exits the service superposition area, or switches to a mode based on the second communication network.

5. The method as claimed in claim 2, wherein, in the step of determining if the current position corresponds to the shadow area of the second communication network, the determination is achieved by determining if a number of counted cells according to movement between cells is less than a minimum number of cells according to movement between cells.

6. The method as claimed in claim 1, wherein the first communication network is a code division multiple access network and the second communication network is a wideband code division multiple access network.

7. The method as claimed in claim 1, further comprising a step of attempting roaming to the second communication network during a predetermined time interval exponentially increasing based on a number of ping-pong occurrences representing a number of roaming attempts when the current position does not correspond to the shadow area of the second communication network.

8. The method as claimed in claim 1, further comprising the steps of:
    determining if a signal from the second communication network is detected by attempting roaming to the second communication network during a predetermined time interval; and
    performing a mode based on the second communication network by completing the roaming to the second communication network when an intensity of the detected signal exceeds a predetermined intensity.

9. The method as claimed in claim 1, further comprising the steps of:
    switching to a second communication network shadow state when the current position corresponds to a shadow area of the second communication network;
    determining if movement between cells exists in the second communication network shadow state; and
    attempting roaming to the second communication network with a maximum ping-pong period when there is no movement between cells.

10. The method as claimed in claim 9, further comprising a step of maintaining a mode based on the first communication network when the movement between cells exits.

11. The method as claimed in claim 1, wherein the first communication network is a national network and the second communication network is a local network.

12. A dual mode mobile terminal for performing roaming for minimizing a ping-pong phenomenon, the dual mode mobile terminal comprising:
    a first module for receiving from a first communication network information representing whether or not the dual mode mobile terminal is in a service superposition area, enabling communication through a first communication network scheme, and detecting a signal received from the first communication network;
    a second module for enabling communication through a second communication network scheme and detecting a signal detected by the second communication network; and
    a controller for determining if a current position is the service superposition area based on information received from the first communication network, attempting roaming to the second communication net work during a predetermined time interval when the current position corresponds to the service superposition area, determining if the current position corresponds to a shadow area of the second communication network by determining a failure of the roaming attempt and movement between cells, and attempting roaming to the second communication network by maximizing the predetermined time interval when the current position corresponds to the shadow area of the second communication network.

* * * * *